Patented Jan. 29, 1952

2,583,774

UNITED STATES PATENT OFFICE 2,583,774

VITAMIN B6 DERIVATIVES

Dorothea Heyl Hoffman, Rahway, N. J., assignor to Merck & Co., Inc., Rahway, N. J., a corporation of New Jersey No Drawing. Application April 30, 1948,
Serial No. 24,412

4 Claims. (Cl. 260—294.9)

This invention relates generally to the preparation of compounds having vitamin-like properties. More particularly, it relates to the preparation of derivatives of vitamin $B_6$, such as, the lactone of 2 - methyl - 3 - hydroxy - 4 - carboxy-5-hydroxymethylpyridine and the like, compounds having physiological activity similar to that of vitamin $B_6$.

The lactone of 2-methyl-3-hydroxy-4-carboxy-5-hydroxymethylpyridine, a compound known to possess growth-promoting and anti-anemia activity, has been obtained from urine by boiling in the presence of acid. It has also been proposed to prepare the lactone of 2-methyl-3-hydroxy - 4 - carboxy - 5 - hydroxymethylpyridine by treatment of vitamin $B_6$ (2-methyl-3-hydroxy-4,5 - dihydroxymethylpyridine) with oxidizing agents, for example, barium permanganate. This method however is unsatisfactory in that it produces very limited quantities of an impure compound. Furthermore such a process is very costly and unsuited for production on a commercial scale.

I have now found that I can prepare derivatives of vitamin $B_6$ directly from readily available material such as, for example, the oxime of 2 - methyl - 3 - hydroxy - 4 - formyl - 5 - hydroxymethylpyridine. The preparation of this oxime is described in the copending application Serial No. 545,005, filed July 14, 1944, now abandoned.

In carrying out the process in accordance with my invention herein disclosed, the oxime of 2 - methyl - 3 - hydroxy - 4 - formyl - 5 - hydroxymethylpyridine is first treated with an aliphatic acid anhydride, whereby the acylated oxime of 2 - methyl - 3 - acyloxy - 4 - formyl-5-acyloxymethylpyridine is formed. This acylated oxime can be isolated in crystalline form. Further treatment of this oxime with the aliphatic acid anhydride results in the formation of 2 - methyl - 3 - acyloxy - 4 - cyano - 5 - acyloxymethylpyridine. This compound may be obtained directly from the oxime of 2-methyl-3-hydroxy - 4 - formyl - 5 - hydroxymethylpyridine by refluxing the oxime with a lower aliphatic acid anhydride such as acetic acid anhydride, propionic acid anhydride, butyric acid anhyride, and the like, for several hours. The hydrolysis of 2 - methyl - 3 - acyloxy - 4 - cyano - 5 - acyl- oxymethylpyridine may be carried out first by heating with an alkali in the presence of alcohol to form 2 - methyl - 3 - hydroxy - 4 - carboxy-5 - acyloxymethylpyridine. This compound is then further hydrolyzed in the presence of aqueous alkali and the formed 2-methyl-3-hydroxy-4-carboxy-5-hydroxymethylpyridine can then be isolated. The hydrolysis of 2-methyl-3-acyloxy-4-cyano-5-acyloxymethylpyridine may be accomplished in one step if desired. Treatment of 2 - methyl - 3 - acyloxy - 4 - cyano - 5 - acyloxymethylpyridine with aqueous alkali solution results in the formation of 2-methyl-3-hydroxy-4-carboxy-5-hydroxymethylpyridine in good yields.

Alternatively the compound 2-methyl-3-hydroxy - 4 - carboxy - 5 - hydroxymethylpyridine may be prepared by halogenating the oxime of 2 - methyl - 3 - hydroxy - 4 - formyl - 5 - hydroxymethylpyridine with a halogenating agent such as thionyl chloride, phosphorus halide and the like, to form 2-methyl-3-hydroxy-4-cyano-5-halogenmethylpyridine. This compound may then be directly hydrolyzed in the presence of aqueous alkali, whereby the 2-methyl-3-hydroxy-4-carboxy-5-hydroxymethylpyridine is formed. The hydrolysis can be carried out in two steps if desired. When the 2-methyl-3-hydroxy-4-cyano-5-chloromethylpyridine is heated with water, a 2 - methyl - 3 - hydroxy - 4 - carbamyl-5-hydroxymethylpyridine is formed which can be isolated in the form of the hydrochloride salt, M. P. 210–211° (with decomposition). This carbamyl compound can then be conveniently hydrolyzed in the presence of aqueous alkali and the formed 2 - methyl - 3 - hydroxy - 4 - carboxy-5-hydroxymethylpyridine can then be isolated by conventional methods.

The lactone of 2 - methyl - 3 - hydroxy - 4-carboxy-5-hydroxymethylpyridine can then be prepared by treating the 2-methyl-3-hydroxy-4-carboxy-5-hydroxymethyl compound with a solution of an inorganic acid preferably in the presence of alcohol. This lactone can then be purified according to conventional methods and is isolated as a crystalline material having a melting point of 273°–273½° (with decomposition).

The following examples illustrate methods of carrying out the present invention, but it is to be understood that these examples are given by way of illustration and not of limitation.

Example 1

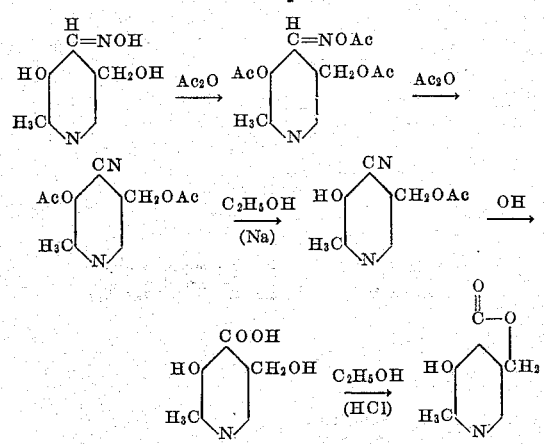

About 1 g. of the oxime of 2-methyl-3-hydroxy-4-formyl-5-hydroxymethylpyridine (prepared as disclosed in the co-pending application, Serial No. 545,005) was refluxed for about 20 minutes with approximately 10 ml. of acetic anhydride. The acetic anhydride was removed under diminished pressure and the residue heated twice with alcohol which was also removed under diminished pressure. The resulting residue was dissolved in ether, washed twice with aqueous dilute sodium bicarbonate solution, and three times with water. The ether solution, after treatment with activated charcoal, was filtered, concentrated to dryness, and the residue was further dried by adding benzene which was removed by heating. The crude product so obtained was purified by recrystallization from alcohol and water to obtain the acetoxime of 2-methyl-3-acetoxy-4-formyl-5-acetoxymethylpyridine having a melting point of about 114½ to 115° C.

A portion of this acetoxy compound was treated further by heating under reflux with acetic anhydride for about 2 hours. The acetic anhydride was then removed under diminished pressure and the residue so obtained was treated with ethanol. After removing the alcohol under diminished pressure the residue was dissolved in ether, the ether solution was washed with sodium bicarbonate solution, followed by water wash, and then filtered after treatment with a small amount of activated charcoal. The ether was evaporated and the residue dried by distillation of benzene. The product so obtained was allowed to crystallize from a mixture of ether and petroleum-ether to obtain crystals of 2-methyl-3-acetoxy-4-cyano-5-acetoxymethylpyridine (M. P. 63–64° C.).

About 7 g. of 2-methyl-3-acetoxy-4-cyano-5-acetoxymethylpyridine was refluxed for about 2 hours with approximately 200 cc. of anhydrous ethanol containing about 0.2 g. of sodium. The resulting solution was cooled, poured into excess ice cold dilute hydrochloric acid, and concentrated to approximately 50 ml. under reduced pressure, causing precipitation of the crude product. The crude product was removed by filtration, and purified by conventional methods of recrystallization from ethanol to obtain 2-methyl-3-hydroxy-4-cyano-5-acetoxymethylpyridine crystals having a melting point of 209–210° C. This product gives a red color with ferric chloride solution, showing that a free hydroxyl group is present in the 3-position.

A portion of the 2-methyl-3-hydroxy-4-cyano-5-acetoxymethylpyridine was refluxed with an aqueous solution of potassium hydroxide (approximately 3 N) yielding first the 2-methyl-3-hydroxy-4-cyano-5-hydroxymethylpyridine. After additional refluxing with 3 N potassium hydroxide the solution was then filtered, made acid to Congo-red with concentrated hydrochloric acid, and cooled, causing precipitation of a crystalline product which was removed by filtration. The crystalline product was washed with dilute hydrochloric acid, repeatedly with water, and finally with alcohol and ether. The 2-methyl-3-hydroxy-4-carboxy-5-hydroxymethylpyridine thus obtained was found to melt at 253–254° C. with decomposition.

A suspension of about 3.7 g. of 2-methyl-3-hydroxy-4-carboxy-5-hydroxymethylpyridine was heated under reflux with about 100 cc. of absolute ethanol containing about 20 cc. of concentrated solution of hydrogen chloride in ethanol, for about 2½ hours. After cooling the resulting solution, the solid product was removed by filtration, washed with alcohol, and dissolved in water to which was added an excess of sodium bicarbonate. This caused precipitation of a solid material which was removed by filtration, washed with water, alcohol, and ether, and was finally dried. The product was purified by conventional methods to obtain crystals of the lactone of 2-methyl-3-hydroxy-4-carboxy-5-hydroxymethylpyridine having a melting point of about 273–273½° C. with decomposition.

Example 2

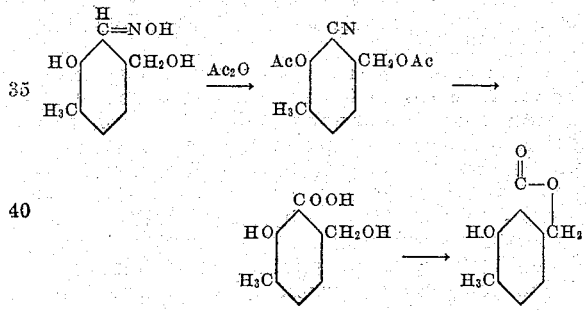

Approximately 50 g. of the oxime of 2-methyl-3-hydroxy-4-formyl-5-hydroxymethylpyridine was heated under reflux with about 500 ml. of acetic anhydride for about 2½ hours. The acetic anhydride was then removed under diminished pressure, and the residue so obtained was treated with ethanol. After removing the alcohol under diminished pressure, the residue was dissolved in ether. The ether solution was washed four times with saturated sodium bicarbonate solution, followed by three washings with water, and then filtered after treatment with a small amount of activated charcoal. The ether was evaporated and the residue dried by distillation of benzene. The residue was crystallized from a mixture of ether and petroleum-ether to obtain crystals of 2-methyl-3-acetoxy-4-cyano-5-acetoxymethylpyridine (M. P. 63–64° C.).

About 24 g. of 2-methyl-3-acetoxy-4-cyano-5-acetoxymethylpyridine was heated under reflux with about 500 ml. of potassium hydroxide (3 N) for about 7 hours. The resulting solution was filtered, acidified to Congo red with hydrochloric acid (conc.) and cooled. This caused precipitation of a solid which was removed by filtration, purified and dried by conventional operations to obtain 2-methyl-3-hydroxy-4-carboxy-5-hydroxymethylpyridine (M. P. 253–4° C. with decomposition).

The 2-methyl-3-hydroxy-4-carboxy-5-hydroxymethylpyridine thus obtained is converted to the corresponding lactone in accordance with the procedure shown in Example 1.

Example 3

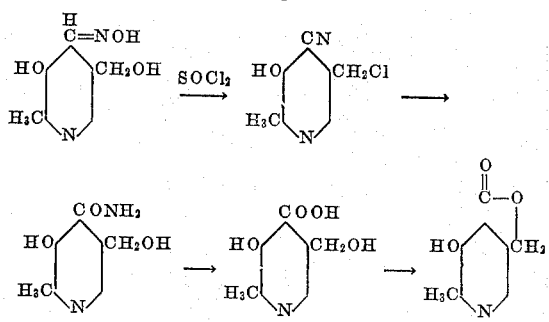

About 3 g. of the oxime of 2-methyl-3-hydroxy-4-formyl-5-hydroxymethylpyridine was treated with about 15 ml. of thionyl chloride. A vigorous exothermic reaction ensued, after which the mixture was allowed to stand at room temperature for 10 minutes and then mixed with ether and filtered. The hydrochloride thus obtained was decomposed by crystallization from water to form crystals of 2-methyl-3-hydroxy-4-cyano-5-chloromethylpyridine having a melting point of 167–168° C. with decomposition.

About $\frac{2}{10}$ g. of 2-methyl-3-hydroxy-4-cyano-5-chloromethylpyridine hydrochloride was refluxed for about 40 minutes with 13 ml. of water. The resulting solution was decolorized with activated charcoal, and concentrated to dryness under reduced pressure. The residue thus obtained was crystallized from ethanol to yield a crystalline product consisting of 2-methyl-3-hydroxy-4-carbamyl-5-hydroxymethylpyridine hydrochloride having a melting point of about 210–211° C. (with decomposition).

The 2-methyl-3-hydroxy-4-carbamyl-5-hydroxymethylpyridine hydrochloride was heated under reflux with an aqueous alkaline solution to obtain 2-methyl-3-hydroxy-4-carboxy-5-hydroxymethylpyridine which was recovered by conventional operations.

Alternatively, the 2-methyl-3-hydroxy-4-cyano-5-chloromethylpyridine was heated with an aqueous alkaline solution under reflux to produce 2-methyl-3-hydroxy-4-carboxy-5-hydroxymethylpyridine directly. The latter product is recovered in accordance with conventional chemical operations.

Modifications may be made in carrying out the present invention without departing from the spirit and scope thereof, and this invention is to be limited only by the appended claims.

I claim:

1. 2-methyl-3-hydroxy-4-cyano-5-acetoxy-methylpyridine.

2. The process for the preparation of 2-methyl-3-hydroxy-4-cyano-5-acetoxymethylpyridine which comprises reacting the oxime of 2-methyl-3-hydroxy-4-formyl-5-hydroxymethylpyridine with acetic anhydride to form the acetoxime of 2-methyl-3-acetoxy-4-formyl-5-acetoxymethylpyridine, heating said acetoxime with an additional amount of acetic anhydride, removing the acetic anhydride, treating the formed residue with alcohol, removing the resulting 2-methyl-3-acetoxy-4-cyano-5-acetoxymethylpyridine and treating said 3-acetoxy-4-cyano-5-acetoxymethylpyridine with a solution of sodium in ethanol.

3. In the process for preparing 2-methyl-3-hydroxy-4-cyano-5-acetoxymethylpyridine by the selective hydrolysis of 2-methyl-3-acetoxy-4-cyano-5-acetoxymethylpyridine, the step which comprises treating said 2-methyl-3-acetoxy-4-cyano-5-acetoxy-methylpyridine with a solution of sodium in ethanol.

4. A compound selected from the group consisting of 2-methyl-3-hydroxy-4-cyano-5-acyloxymethylpyridine, and hydrohalide salts thereof.

DOROTHEA HEYL HOFFMAN.

REFERENCES CITED

The following references are of record in the file of this patent:

UNITED STATES PATENTS

| Number | Name | Date |
| --- | --- | --- |
| 2,455,259 | Martin | Nov. 30, 1948 |
| 2,455,651 | Bortnick | Dec. 7, 1948 |

OTHER REFERENCES

Harris: J. Bio. Chem., vol. 154, pp. 315–316.

Migridichian: "The Chemistry of Organic Cyanogen Compounds," 1947, p. 3.

Chemical Reviews, April 1948, p. 250.